United States Patent [19]
Hurd

[11] 4,106,220
[45] Aug. 15, 1978

[54] MATHEMATICAL TEACHING AID

[76] Inventor: Deane E. Hurd, 5034 W. Kalen Cir., Glendale, Ariz. 85301

[21] Appl. No.: 759,840

[22] Filed: Jan. 17, 1977

[51] Int. Cl.$^2$ .......................................... G09B 19/02
[52] U.S. Cl. .................................... 35/31 R; 177/190
[58] Field of Search ............... 35/31 R, 31 D, 24 C; 273/131 B; 177/190, 191, 196

[56] References Cited

U.S. PATENT DOCUMENTS

| | | | |
|---|---|---|---|
| 591,202 | 10/1897 | Witzel | 177/190 |
| 849,418 | 4/1907 | Nickerson | 177/196 X |
| 1,404,426 | 1/1922 | Becker | 177/191 X |
| 1,415,278 | 5/1922 | Tod | 35/24 C |
| 2,074,384 | 3/1937 | Gattoni | 177/190 |
| 2,672,754 | 3/1954 | Kent | 177/190 X |
| 2,955,811 | 10/1960 | Jonas et al. | 177/190 |
| 3,188,089 | 6/1965 | Odell et al. | 273/131 B |
| 3,204,344 | 9/1965 | McMeen | 35/31 A |
| 3,212,202 | 10/1965 | Heinichen | 35/31 R |
| 3,224,521 | 12/1965 | Czanderna | 177/190 X |
| 3,339,291 | 9/1967 | Ruchlis | 35/31 R |
| 3,486,244 | 12/1969 | Horn | 35/31 R |
| 3,567,221 | 3/1971 | Stults | 35/31 D X |
| 3,928,923 | 12/1975 | Harte | 35/31 R |
| 3,949,491 | 4/1976 | Harte | 35/31 R |

OTHER PUBLICATIONS

Gas Chromatograpny: Academic Press Inc., 1958, Title Page, pp. 96 and 117.

*Primary Examiner*—William H. Grieb
*Attorney, Agent, or Firm*—Cahill, Sutton & Thomas

[57] ABSTRACT

A balance beam teaching aid illustrates and verifies mathematical operations involving both integer and non-integer numbers. The balance beam includes a base, a balance arm having a center of gravity and graduations disposed on a face at predetermined longitudinally spaced intervals and a suspension system for pivotably suspending the balance arm from the base to permit rotation of the balance arm in the vertical plane and for preventing rotation of the balance arm in the horizontal plane. Substantially two dimensional area-weights formed from a uniform density, uniform thickness material are attached to the balance arm by inserting the area-weights into a pressure-closed slot disposed in a face of the balance arm and extending along the entire length thereof. The area-weights are typically cut from sections of relatively heavy paper which has a rectangular grid imprinted thereon.

8 Claims, 4 Drawing Figures

U.S. Patent        Aug. 15, 1978        4,106,220
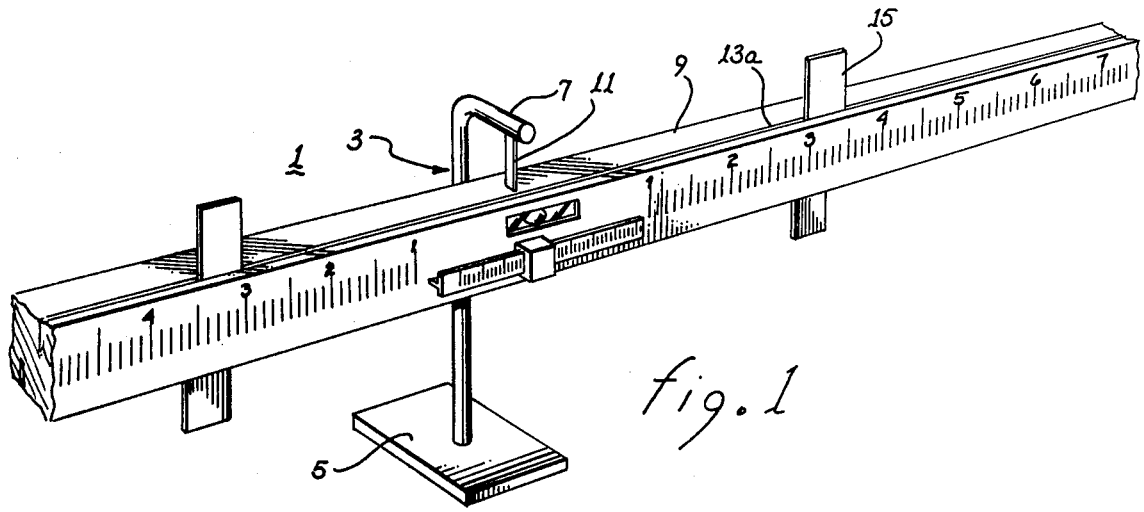
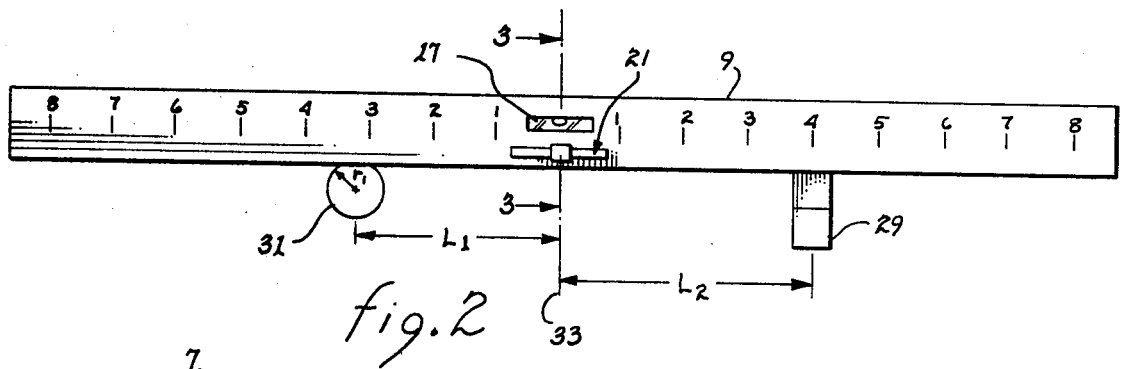
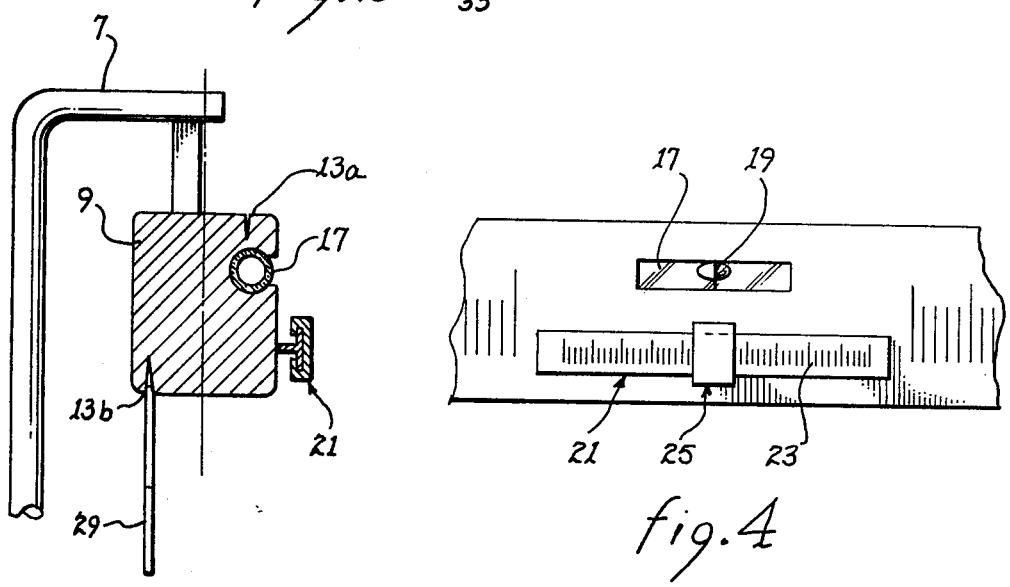

MATHEMATICAL TEACHING AID

BACKGROUND OF THE INVENTION

1. Field of the Invention

This invention relates to mathematical teaching aids, and more particularly, to mathematical teaching aids incorporating a balance beam for illustrating and verifying mathematical operations involving integral and non-integral numbers.

2. Description of the Prior Art

Mathematical teaching aids incorporating a balance beam typically includes a horizontally oriented balance arm which has attachment points for weights located at predetermined spaced intervals. Weights are normally attached to the balance arm by hooks, pans or pegs. The weights which are used in conjunction with the balance beam are typically all of equal mass or of integral multiples of a mass unit (e.g. 1, 5, 10, 25 mass units per weight). Because of the quantizement of the weights into integral values and due to the uniform spacing between each of the attachment points for the weights along the length of the balance arm, these prior art mathematical teaching aids are useable only with equations which include integers. For instance, a balance beam of the design illustrated in U.S. Pat. No. 3,486,244 (the Horn patent) can be used to illustrate that the sum of the integers $4 + 3 + 2 = 9$. An instructor must prepare equations which students can then solve with the assistance of the Horn balance beam. The Horn apparatus is unable to solve an equation in which 1.21 is added to 3.86 to produce the resulting sum of 4.07. Furthermore, it would be possible for a student to attempt to solve a problem which would exceed the limits of the Horn apparatus. This situation would occur if a student attempted to add $4 + 3 + 5$ which would require an answer of 12, but numbers of this magnitude do not appear as possible alternatives on the Horn balance beam.

Clearly, a device such as that illustrated in the Horn patent is useful, but extremely limited in that each of the weights is identical to the others and these weights can only be attached to the balance beam arm at predetermined equal intervals.

Although the Horn apparatus can be used to perform addition, subtraction, multiplication and division, it can only demonstrate these mathematical operations. If a student wishes to verify the results of a mathematical operation which he has performed himself, it might very well be impossible for the Horn apparatus to accomplish that task. Verification would be impossible with the Horn device if the answer exceeded a certain predetermined magnitude or if the answer failed to yield an integral number. While the Horn mathematical teaching aid is useful, it can be readily seen that it has serious shortcomings.

Another mathematical teaching aid is disclosed by Stults in U.S. Pat. No. 3,567,221. The Stults device is substantially similar to that disclosed by Horn, but further includes weights which are magnetically coupled together and which can be subdivided into either smaller or larger mass units. Again, however, the Stults device provides attachment points for these weights only at predetermined intervals upon the balance arm and therefore suffers from the same shortcomings as the Horn device.

Heinichen in U.S. Pat. No. 3,212,202 discloses an additional embodiment of an arithmetic teaching aid. While somewhat different in appearance and structure from the Horn device, the Heinichen device also requires a plurality of equal weight tokens which are positionable in uniformly spaced recesses along the length of the balance beam. While this device can perform the functions of addition, subtraction, multiplication and division, the device can only operate with integral numbers to produce integral results.

Other prior art mathematical teaching aids are illustrated in the following U.S. Pat. Nos. 3,339,291 (Ruchlis), 1,415,278 (Tod). Each of these devices is basically similar in nature and operation to the Horn device and suffers from the same shortcomings.

Other balance beam inventions which are less related to the present invention are disclosed in the following patents: U.S. Pat. Nos. 3,224,521 (Czanderna), 1,404,426 (Becker), 849,418 (Nickerson), 3,188,089 (Odell), 2,955,811 (Jonas), 591,202 (Witzel), and 2,672,754 (Kent).

SUMMARY OF THE INVENTION

It is therefore a primary object of the present invention to provide a mathematical teaching aid which will allow students to visually verify the results of both integral and non-integral numerical computations with a high degree of accuracy.

Another object of the present invention is to provide a mathematical teaching aid which will allow students to precisely determine the area of any substantially two dimensional object, such as a circle, a parallelogram, a triangle or an ellipse.

Yet another object of the present invention is to provide a mathematical teaching aid which will enable a student to precisely determine the value of the mathematical constant $\pi$.

Still another object of the present invention is to provide a mathematical teaching aid which will visually indicate mathematical equality to a student by centering the bubble of a level positioned in the center of a balance arm.

Yet another object of the present invention is to provide a mathematical teaching aid which is simple to operate and inexpensive to purchase.

A still further object of the present invention is to provide a mathematical teaching aid which is highly resistant to damage due to its rugged construction.

A yet further object of the present invention is to provide a mathematical teaching aid which includes a vernier scale to extend the measurement sensitivity of the system.

An additional object of the present invention is to provide a mathematical teaching aid which utilizes area-weights, the area of which are directly proportional to their weight.

Briefly stated, and in accord with one embodiment of the invention, a mathematical teaching aid for illustrating and verifying mathematical operations involving integral and non-integral numbers includes a base, a balance arm having a center of gravity and graduations disposed on a face at predetermined longitudinally spaced intervals, and suspension means for pivotably suspending the balance arm from the base to permit rotation of the balance arm in a vertical plane while preventing rotation of the balance arm in the horizontal plane. For basic operations a first area-weight having a known mass and fabricated from a uniform density material is slidably attached to one side of the balance arm. A second area-weight having an unknown mass and fabricated from a uniform density material is attached to the opposite side of the balance arm. The first and the second area-weights are attached to the balance arm by an attaching means which permits attachment at continuously variable locations along the length of the balance arm. Because the mass of the first area-weight is known and the relative displacement of both the first and second area-weights from the center of the balance beam can be measured, the mass and therefore the area of the second area-weight can be readily determined when the arm of the balance beam is perfectly balanced.

DESCRIPTION OF THE DRAWING

The invention is pointed out with particularity in the appended claims. However, other objects and advantages, together with the operation of the invention, may be better understood by reference to the following detailed description taken in connection with the following illustrations wherein:

FIG. 1 is a perspective view of a mathematical teaching aid of the present invention, illustrating area-weights attached to both the upper surface and the lower surface of the balance arm.

FIG. 2 is a front view of the balance arm of the mathematical teaching aid shown in FIG. 1.

FIG. 3 is a sectional view of the balance arm shown in FIG. 2, taken along line 3—3.

FIG. 4 is an enlarged view of the balance arm illustrated in FIG. 2 showing the level and vernier scale in greater detail.

DESCRIPTION OF THE PREFERRED EMBODIMENT

In order to better illustrate the advantages of the invention and its contributions to the art, a preferred hardware embodiment of the invention will now be described in some detail.

Referring to FIG. 1, mathematical teaching aid 1 includes a base 3 which consists of a base plate 5 and a support arm 7. A perfectly linear, uniform density balance arm 9 is pivotably suspended from support arm 7 by a suspension means or hinge 11. Hinge 11 can be fabricated from metal or plastic and is sufficiently wide to prevent rotation of balance arm 9 in the horizontal plane while freely allowing pivotable movement in the vertical plane.

Referring now to FIGS. 1 and 3, attachment means or grooves 13a and 13b are provided in the upper and lower faces of balance arm 9. In the preferred embodiment attachment means 13a and 13b include pressure-closed slots into which substantially two dimensional area-weights, such as weight 15, can be attached by pressing an edge of the area-weight into groove 13a.

Attachment means 13 can also include magnetic, cohesive, adhesive, electro-static or any other similar means for mechanically securing the area-weights into attachment means 13.

The design of the area-weights utilized with this mathematical teaching aid are extremely significant for the proper functioning of the apparatus. Since the area-weights of the present invention are substantially two dimensional (i.e. they have a constant, relatively shallow depth), the mass or weight of each of the area-weights is directly proportional to its area. Area-weights 15 can be fabricated from poster paper, bristol board or even from ordinary graph paper. It is desired that the area-weights contain a graph-like rectangular grid so that if a student wishes to manufacture an area-weight of ten units, he can cut out a section of the grid which includes ten squares.

The two dimensional feature of the area-weights is necessitated solely by the requirement that an edge of each area-weight be positioned within attachment means 13. The relatively thin depth of area-weights 15 makes it easier for students to cut out a predetermined size area weight with scissors or a knife.

Referring now to FIGS. 3 and 4, a level 17 is mounted in the face of balance arm 9 with its center perfectly aligned with hinge 11 and coincident with the center of gravity of balance arm 9. The longitudinal axis of level 17 is aligned parallel with the longitudinal axis of balance arm 9 so that when balance arm 9 is in a horizontal position, the bubble within level 17 will be perfectly centered about level index 19. Level 17 allows a student working with mathematical teaching aid 1 to easily and correctly determine when balance arm 9 is properly balanced.

A vernier scale 21 includes a calibrated slide assembly 23 and a moveable weight 25. Vernier scale 21 is provided in mathematical teaching aid 1 to add or subtract predetermined small increments of weight from either side of balance arm 9.

The method of using mathematical teaching aid 1 to derive the value of $\pi$ will now be described by referring to FIG. 2. Area-weight 29 represents the known weight and has a weight of two units. Area-weight 31 represents the unknown weight and is cut in the shape of a circle which has a radius "$r$", which can be measured with a ruler. Index line 33 represents an extension of the center line of balance beam 9. $L_1$ indicates the distance between center line 33 and the center of circle 31. $L_2$ indicates the distance between the center of mass of known weight 29 and center line 33.

Since it is known that the area (designated by the letter "A") of circular area-weight 31 equals $\pi r^2$, this equation can be used in conjunction with mathematical teaching aid 1 to derive the precise value for the constant $\pi$. Since in FIG. 2 balance arm 9 is in an equilibrium or balanced condition, we know from the conservation of torque requirements that the following equation applies:

(Equation 1) $\quad L_1 \times W_1 = L_2 \times W_2$ where $W_1$ and $W_2$ represent the weights or area-weights 31 and 29, respectively. By definition since the weight of area-weights 31 and 29 are proportional to their area, the following equation also applies:

(Equation 2) $\quad L_1 \times A_1 = L_2 \times A_2$ where $A_1$ represents the unknown area of circular area-weights 31 and $A_2$ represents the known area of rectangular area-weight 29. Since $A_1$ is a circle:

(Equation 3) $\quad A_1 = \pi r^2$

Since the weight of area-weight 29 is directly proportional to its area which is equal to two units, we know that:

(Equation 4) $\quad L_1 A_1 = 2L_2$

Rearranging Equation 4, combining Equation 4 with Equation 3, and placing all of the known quantities on the right side of the equal sign gives us the following equation:

(Equation 5) $A_1 = 2L_2/L_1$ (Equation 6) $\pi r^2 = 2L_2/L_1$ (Equation 7) $\pi = 2L_2/r^2L_1$ Since $r$, the radius of area-weight 31, can be mesured with a ruler and since lengths $L_1$ and $L_2$ can be measured from the scale on the front face of balance arm 9, and if necessary with the assistance of vernier scale 21, placing the values of the known quantities into the right side of equation 7 produces the following results:

(Equation 8) $\pi = 3.14$

Thus a student by cutting out a single known area-weight, by measuring the radius of a circle having an unknown area, and by reading $L_1$ and $L_2$ directly from the face of balance arm 9 can empirically determine the value of $\pi$ and verify that the value of $\pi$ is equal to 3.14.

An obvious permutation of the above operation would be to derive the radius of circle 31 by performing the same operations if it was assumed that the student already knew the value of $\pi$. Then the equation for the unknown radius would appear as follows:

(Equation 9) $r^2 = 2L_2/\pi L_1$ (Equation 10) $r = \sqrt{2L_2/\pi_1}$

The student can thus verify that $\pi$ is equal to 3.14 by merely measuring the radius of area-weight 31 and determining that the computed value for $r$ is equal to the measured value for $r$.

This type of demonstration is mentally stimulating for students and provides direct and immediate verification of the correctness of mathematical operations which they have numerically computed. Thus a student can perform a numerical computation and check his computations with mechanical teaching aid 1. Clearly, prior art devices of this type are not able to accomplish this result since they require integral numerical values for the weights which can only be positioned at predetermined intervals along the balance arm. These restrictions severly limit the types of exercises which can be calculated and verified by prior art mathematical teaching aids.

In a manner similar to that described above for finding the area of a circle, a student or an instructor can utilize mathematical teaching aid 1 to compute or verify the area of a triangle ($A = \frac{1}{2}$ bh) by solving the following equations:

(Equation 11) $L_1A_1 = L_2A_2$ (Equation 12) $A_2 = $ Known area-weight (Equation 13) $A_1 = L_2A_2/L_1$ The student can thus ascertain a value respresentative of the area of a triangle by using mathematical teaching aid 1. Then by using a ruler and the formula for the area of a triangle, the student can compute the area of the triangle. When the area which is computed numerically and by use of mathematical teaching aid 1 agree, the validity of the formula for computing the area of a triangle will be dramatically reinforced in the student's mind.

Similarly, a student or instructor can demonstrate the validity of the equation for finding the area of a parallelagram, a rectangle or an ellipse. The same technique for using mathematical teaching aid 1 applies to other geometric-related equations.

Mathematical teaching aid 1 can also be used in a manner identical to prior art mathematical teaching aids to add, subtract, multiply and divide. The above mentioned methods for deriving $\pi$ and for calculating the area of geometric figures demonstrates the ability of mathematical teaching aid 1 to perform multiplication.

To perform the function of division of two non-integral numbers, such as 4.8 divided by 1.2, a student must first cut out area-weights of 4.8 units and 1.2 units. He then places one area-weight on one side of hinge 11 and the other area-weight on the other side of hinge 11. A student can then derive the quotient of these two numbers by positioning one area-weight, for instance the right area weight, at a distance $L_2 = 1$ unit. He then slides the second area-weight until balance beam 9 is balanced as indicated by level 17. He will solve the following equation:

(Equation 14) $L_1A_1 = L_2A_2$ $A_1 = 4.8 \quad A_2 = 1.2 \quad L_1 = 1$ (Equation 15) $(4.8/1.2) = (A_1/A_2) = (L_2/L_1)$ (Equation 16) $L_2 = (A_1L_1/A_2)$ Since all quantities on the right side of Equation 16 are known, the student can solve the problem by balancing arm 9 and reading the value of $L_2$ which will equal 4 units, which is the correct answer. Because integral numbers are not required, the student can determine the quotient of any two numbers, integral or nonintegral.

A more detailed explanation of the use of vernier scale 21 will now be described. The following equation applies when weight 25 of vernier scale 21 is displaced from its central position:

(Equation 17) $L_1A_1 = L_2A_2 + L_3W_3$

If weight 25 is displaced to the right in the problem discussed above in relation to FIG. 2, $L_3$ will be a positive quantity. If weight 25 is displaced to the left, then $L_3$ will be a negative quantity and will subtract from the right hand side of Equation 17. $L_1$, $L_2$ and $L_3$ must all be expressed in the same units (e.g. centimeters), so that if weight 25 is displaced to the right 5 millimeters, then $L_3$ will be expressed as +0.5 centimeters. The weight of slide weight 25 which corresponds to $W_3$ in Equation 17 must also be expressed in units which are equivalent to those used for indicating the area-weight of weights $A_1$ and $A_2$. As long as the length and weight units are kept equal in Equation 17, a student will be able to properly solve a mathematical problem. Thus an additional instructional aid for students resulting from the use of mathematical teaching aid 1 could be practice in maintaining length and weight units in the proper relationship.

It will be apparent to those skilled in the art that the disclosed mathematical teaching aid may be modified in numerous other ways and may assume many embodiments other than the preferred form specifically set out and described above. Accordingly, it is intended by the appended claims to cover all such modifications of the invention which fall within the true spirit and scope of the invention.

What is claimed is:

1. An apparatus for illustrating and verifying mathematical operations involving integral and nonintegral numbers, comprising:
   a. a base;
   b. a balance arm having a center of gravity and graduations disposed on a face of said balance arm at predetermined longitudinally spaced intervals;
   c. suspension means for pivotably suspending said balance arm from said base to permit rotation of said balance arm in a vertical plane and for preventing rotation of said balance arm in a horizontal plane;
   d. at least two area-weights for performing mathematical problems in conjunction with said balance arm, said area-weights comprising a uniform density, uniform thickness sheet material, whereby the area of said area-weights is proportional to their weight and thereby permitting mathematical computations relating to areas, weights and area versus weight; and
   e. attachment means for securely attaching said area-weights to said balance arm at any location along the length of said balance arm, said attachment means including means for securing said area-weights to said balance arm independent of the force of gravity to maintain said attachment means operative.

2. The apparatus of claim 1 wherein said balance arm further includes a vernier scale symmetrically disposed about the center of gravity of said balance arm.

3. The apparatus of claim 1 wherein said attachment means includes:
   a. a cohesive layer attached to a face of said balance arm; and
   b. a further cohesive layer attached to a portion of each of said area-weights for attaching said area-weights to said balance arm at any location along the length of said cohesive layer of said balance arm.

4. The apparatus of claim 1 wherein said attachment means includes:
   a. an adhesive layer attached to a face of said balance arm; and
   b. a further adhesive layer attached to a portion of each of said area-weights for attaching said area-weights to said balance arm at any location along the length of said adhesive layer of said balance arm.

5. An apparatus for illustrating and verifying mathematical operations involving integral and non-integral numbers, comprising:
   a. a base;
   b. a balance arm having a center of gravity and graduations disposed on a face of said balance arm at predetermined longitudinally spaced intervals, said balance arm including a vernier scale symmetrically disposed about the center of gravity of said balance arm and said vernier scale including:
      i. a calibrated slide assembly symmetrically disposed about the center of gravity of said balance arm; and
      ii. a slidable weight attached to said calibrated slide assembly and displaceable thereupon;
   c. suspension means for pivotably suspending said balance arm from said base to permit rotation of said balance arm in a vertical plane and for preventing rotation of said balance arm in a horizontal plane;
   d. at least two area-weights for performing mathematical problems in conjunction with said balance arm, said area-weights comprising a uniform density, uniform thickness sheet material, whereby the area of said area-weights is proportional to their weight and thereby permitting mathematical computations relating to areas, weights and area versus weight; and
   e. attachment means for securely attaching said area-weights to said balance arm at any location along the length of said balance arm.

6. An apparatus for illustrating and verifying mathematical operations involving integral and non-integral numbers, comprising:
   a. a base;
   b. a balance arm having a center of gravity and graduations disposed on a face of said balance arm at predetermined longitudinally spaced intervals;
   c. suspension means for pivotably suspending said balance arm from said base to permit rotation of said balance arm in a vertical plane and for preventing rotation of said balance arm in a horizontal plane;
   d. at least two area-weights for performing mathematical problems in conjunction with said balance arm, said area-weights comprising a uniform density, uniform thickness sheet material, whereby the area of said area-weights is proportional to their weight and thereby permitting mathematical computations relating to areas, weights and area versus weight; and
   e. attachment means for securely attaching said area-weights to said balance arm at any location along the length of said balance arm said attachment means including a pressure-closed slot disposed in a face of said balance arm and extending along the entire length thereof for attaching said area-weights to said balance arm.

7. An apparatus for illustrating and verifying mathematical operations involving integral and non-integral numbers, comprising:
   a. a base;
   b. a balance arm having a center of gravity and graduations disposed on a face of said balance arm at predetermined longitudinally spaced intervals, said balance arm including:
      i. a level symmetrically disposed about the center of gravity of said balance beam for indicating a balanced condition of said balance arm; and
      ii. a vernier scale symmetrically disposed about the center of gravity of said balance arm, said vernier scale including
         1. a calibrated slide assembly symmetrically disposed about the center of gravity of said balance arm; and
         2. a slidable weight attached to said calibrated slide assembly and displaceable thereupon;
   c. suspension means for pivotably suspending said balance arm from said base to permit rotation of said balance arm in a vertical plane and for preventing rotation of said balance arm in a horizontal plane;

d. at least two area-weights formed from a uniform density, uniform thickness material which can be trimmed to a desired area; and e. attachment means for attaching said weights to said balance arm at continuously variable locations along the length of said balance arm, said attachment means including a pressure-closed slot disposed in a face of said balance arm and extending along the length thereof for attaching said area-weights to said balance arm.

8. The apparatus of claim 7 wherein said area-weights are cut from a section of paper containing a rectangular grid.

* * * * *